ical detector. The
United States Patent
Bartoli et al.

[11] Patent Number: 5,459,321
[45] Date of Patent: Oct. 17, 1995

[54] LASER HARDENED BACKSIDE ILLUMINATED OPTICAL DETECTOR

[75] Inventors: Filbert J. Bartoli, Upper Marlboro; Craig A. Hoffman, Columbia; Jerry R. Meyer, Catonsville; James R. Lindle, Bowie, all of Md.

[73] Assignee: The United States of America as represented by the Secretary of the Navy, Washington, D.C.

[21] Appl. No.: 638,116

[22] Filed: Dec. 26, 1990

[51] Int. Cl.⁶ .............................. G01T 1/24; G01J 5/20; H01L 27/14
[52] U.S. Cl. .............. 250/370.13; 250/370.06; 250/338.4; 250/339.01; 257/290; 359/241
[58] Field of Search .............. 359/241; 250/370.06, 250/370.13, 370.14, 338.4, 339; 357/30; 257/290

[56] References Cited

U.S. PATENT DOCUMENTS

| 3,330,644 | 1/1967 | Zemel et al. | 250/211 |
| 3,743,899 | 7/1973 | Berth et al. | 317/235 R |
| 3,808,476 | 4/1974 | McCann | 317/235 R |
| 3,886,530 | 5/1975 | Huber et al. | 340/173 CR |
| 3,971,874 | 7/1976 | Ohta et al. | 359/241 |
| 4,272,164 | 6/1981 | Trussell | 359/241 |
| 4,507,674 | 3/1985 | Gaalema | 357/30 |
| 4,651,001 | 3/1987 | Harada et al. | 250/370.14 |
| 4,846,561 | 7/1989 | Soileau et al. | 359/241 |
| 5,002,369 | 3/1991 | Sakata | 359/241 |
| 5,036,203 | 7/1991 | Solomon | 250/370.13 |
| 5,068,524 | 11/1991 | Elliott et al. | 250/370.13 |

Primary Examiner—Stephen C. Buczinski
Attorney, Agent, or Firm—Thomas E. McDonnell; Charles J. Stockstill

[57] ABSTRACT

A protective layer laser hardens an optical detector. The material for the protective layer is $Hg_{1-y}Cd_yTe$, where Y is selected so that the band gap of the protective layer is higher than the expected energy level for photons impinging on the protective layer. Photons with energy levels lower than the band gap are transmitted by the protective layer while photons exceeding the band gap energy level are absorbed or reflected by the protective layer. A semiconductor junction can be formed on the opposite side of the substrate from a $Hg_xCd_xTe$ layer with a band gap lower than the expected energy level, so that photons transmitted through the substrate are absorbed in the $Hg_xCd_xTe$ layer and, therefore, detected at the junction. At sufficiently high intensities where detector damage could result, the protective layer switches so that the incident photons are either absorbed or reflected, thus protecting the detector from damage.

13 Claims, 1 Drawing Sheet

LASER HARDENED BACKSIDE ILLUMINATED OPTICAL DETECTOR

FIELD OF THE INVENTION

The present invention relates to protective layers for sensor systems and, more specifically, to protective layers that protect optical sensors from damage due to energetic laser beams.

BACKGROUND OF THE INVENTION

FIG. 1 shows a typical backside illuminated detector element 1 comprising a substrate 10 having a back surface 12 and a front surface 14. A layer of detector material 16 is bonded to front surface 14 to form the detector element 1. Detector layer 16 comprises layers of opposite type P and N layers whose interface forms a PN semiconductor junction 15. Semiconductor junction 15 operates as a photovoltaic detector, which produces– for example–an open circuit voltage when the junction interacts with a photon.

Incident light strikes back surface 12 of substrate 10, passes through substrate 10 and is then absorbed by detector material 16. Substrate 10 is formed from a material substantially transparent to the optical wavelengths of interest - for example, a wavelength of 8–12 microns for infrared (IR) sensing. Substrate 10 can be a cadmium telluride (CdTe) crystal while detector material 16 can be a mercury cadmium telluride (HgCdTe) layer.

If substrate 10 and detector layer 16 are processed to form an array of detector elements 1, conventional array addressing techniques can address any individual detector element.

Laser beams can damage optical sensor systems–particularly sensor arrays. The system (not shown) increases the intensity of incident light by several orders of magnitude before the light reaches the system's focal plane. Detector layer 16 is positioned in the focal plane of the sensor system, the point of maximum optical intensity. Unlike substrate 10 which transmits the light, detector material 16 absorbs the light's energy. Thus, detector element 1, the "eye" of the system, is the system's most easily damaged component.

SUMMARY OF THE INVENTION

Accordingly, an object of the present invention is to harden an optical detector with an energy selective layer that transmits low intensity radiation but blocks high intensity radiation.

Another object of the present invention is to provide a laser hardened optical detector that can be fabricated at low cost using conventional semiconductor fabrication techniques.

Another object of the present invention is to provide a laser hardened optical detector with a protective layer that switches from a transmitting state to a reflecting state responsive to the energy level of impinging radiation.

Another object of the present invention is to provide a laser hardened optical detector with a protective layer that switches from a transmitting state to an absorbing state responsive to the energy level of impinging radiation.

A further object of the present invention is to provide a protective film–suitable for laser hardening optical detectors –with low absorption characteristics and negligible insertion losses so that the protective layer does not degrade the detector's performance.

These and other objects and advantages are achieved by a protective layer that responds to the energy level of incident photons by switching between transmissive modes. Such a layer can be disposed between a detecting layer and an illuminating laser.

These and other objects, features and advantages of the invention are disclosed in or apparent from the following description of preferred embodiments in which like numbers denote like or similar elements.

BRIEF DESCRIPTION OF THE DRAWINGS

The preferred embodiments are described with reference to the drawings, in which.

DESCRIPTION OF THE PREFERRED EMBODIMENTS

Figure 1:
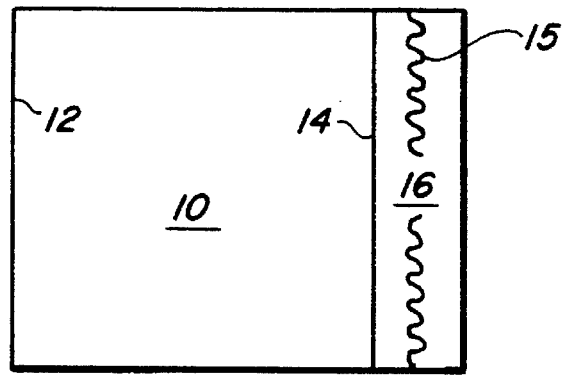
FIG. 1 is a schematic side view of a conventional, back illuminated, optical detector element.
Figure 2:
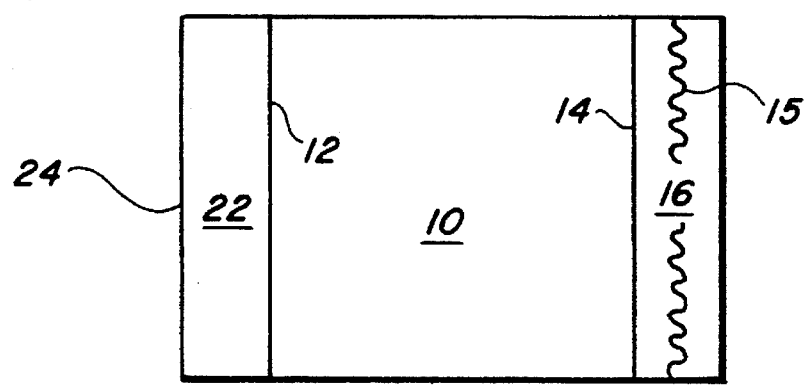
FIG. 2 is a schematic side view of a laser hardened optical detector element according to the present invention.

Referring now to the drawings, FIG. 2 shows a laser hardened optical detector element 2 according to the present invention. Detector element 2 comprises a crystalline substrate 10 with front surface 14 and back surface 12. Detector layer 16 comprises layers of opposite type P and N layers whose interface forms a PN semiconductor junction 15. A protective, optically nonlinear layer 22 covers surface 12.

In order for protective layer 22 to perform its function, layer 22 must have a large, nonlinear, optical coefficient. This causes layer 22 to switch from a transmitting mode to an absorbing or reflecting mode when the optical radiation striking surface 24 exceeds a predetermined threshold intensity. The transmitting mode, absorbing mode and reflecting mode are the three operational modes of the laser hardened optical detector. The composition of layer 22 that is selected during fabrication determines the threshold intensity. The difference between the incident light intensity and the threshold intensity determines the rate at which layer 22 switches between its modes.

Layer 22 photoionizes when it absorbs photons with energy exceeding its band gap. Photons with less than the band gap energy are not absorbed and, thus, are transmitted through layer 22 to substrate 10. Substrate 10 transmits photons at the wavelengths of interest. Since the band gap of detector element layer 16 is selected to be lower than the band gap of layer 22, detector layer 16 absorbs the lower energy photons to produce free charge carriers in semiconductor junction 15. These free charge carriers produce an electrical signal responsive to the photon energy.

In a preferred embodiment, the material in layer 22 is selected so that its energy gap is between 1 and 2 times the expected photon energy of a predicted threat laser. This range allows the atoms in layer 22 to absorb two photons from a high intensity laser beam.

In the preferred embodiment, protective layer 22 has a lower coefficient of absorption than detector layer 16 and protective layer 22 is thicker than detector layer 16. When a laser strikes sensor 2, the lower absorption coefficient and greater thickness of layer 22 cooperate to cause a lower energy density than would develop in thinner, more absorptive, detector layer 16. Because layer 22 has a lower energy density, layer 22 resists damage by an intensity that would destroy detector layer 16.

Both protective layer 22 and detector layer 16 are materials with crystalline structures substantially identical to the structure of substrate 10. If substrate 10 is CdTe, then protective layer 22 is, preferably, HgCdTe. More specifically, the protective layer in the preferred embodiment is formed with a structure of $Hg_{1-Y}Cd_YTe$ and the detector layer is formed with a structure of $Hg_{1-X}Cd_XTe$. The thickness of protective layer 22 depends upon its nonlinearity. For $Hg_{1-Y}Cd_YTe$ layers, a thickness of 10–100 microns is advantageous.

The values X and Y determine the operating characteristics of protective layer 22 and detector layer 16. X and Y are determined so that protective layer 22 transmits while detector layer 16 absorbs at a predetermined wavelength of interest. Preferably, Y is greater than X.

Conventional semiconductor fabrication techniques can inexpensively fabricate sensor 2. For example, the same liquid phase epitaxy fabrication equipment can form both protective layer 22 and detector layer 16.

Typical thicknesses for substrate 10 range from 0.3 to 1.0 millimeter (mm). Substrate 10 must be thick enough to support detector layer 16. However, if substrate 10 is too thick, an optical beam focussed on detector layer 16 will be significantly out of focus at layer 22: protective layer 22 might not experience sufficient intensity to switch states although the intensity is sufficient to damage detector 16. The thickness of protective layer 22 depends upon its nonlinearity.

Preferably, substrate 10 is cadmium telluride (CdTe), although other materials can advantageously be used. The material for protective layer 22 should be chosen to be nearly structurally identical to the material of substrate 10. For example, $Hg_{1-Y}Cd_YTe$ has a very low absorption coefficient at the expected photon energy and has an index of refraction almost identical to that of CdTe.

Optical radiation is either reflected or transmitted when it strikes an interface surface separating two materials–here surface 12 between protective layer 22 and substrate 10. The percent reflected depends on the relationship between the refractive indices of the two materials. If the indices are approximately equal, the optical radiation is transmitted through the interface surface. Because the refractive indices of layer 22 and substrate 10 are nearly equal in the preferred embodiment, layer 22 produces low insertion losses. Because insertion losses due to the protective layer 22 are negligible, the overall operating efficiency of laser hardened detector element 2 is substantially equal to that of unprotected detector element 1.

It will be appreciated that the present invention is not limited to the structure described above. Protective layer 22 can advantageously protect other detecting and transmitting structures. For example, layer 22 could cover a front illuminated detector layer.

In addition, the present invention is not limited to a single protective layer 22. Protective layer 22 can be a dielectric mirror formed by two or more layers having different dielectric constants. A material's dielectric constant correlates to its refractive index and the refractive index changes when the optical intensity exceeds the layer's threshold. Thus, two or more layers with different dielectric constants produce a protective layer that switches between a transmitting mode and a reflecting mode. Because the protective layer's energy density is a concern only when the layer absorbs, not when it reflects, a dielectric mirror embodiment of protective layer 22 would protect detector layer 16 from higher power lasers. Thus, a dielectric mirror embodiment increases the dynamic range of laser hardened optical detector element 2.

It will also be appreciated that other group II elements can be used to form protective layer 22. For example, zinc (Zn) can form $Hg_{1-Y}Zn_YTe$ crystal layers. Thus, the present invention is applicable to optical detectors produced using other materials, such as platinum silicide (PtSi), extrinsic silicon (Si), and other Group III-V semiconductor compounds.

From the foregoing disclosure and teachings, other modifications and variations to the invention will be apparent to those skilled in the art. Thus, while only certain embodiments of the invention have been specifically described, it will be apparent that numerous modifications may be made without departing from the spirit and scope of the invention.

We claim:

1. A laser hardened optical detector comprising:

a detector layer; and a protective layer having two operational modes;

wherein, said protective layer responds to the incident photon energy level by switching between said modes.

2. The laser hardened optical detector of claim 1, further comprising:

a substrate substantially transparent to the wavelengths to be detected, said substrate having front and back surfaces;

wherein said detector layer is disposed on said front surface and said protective layer is disposed on said back surface, and wherein said detector further comprises sublayers that form a semiconductor junction.

3. The laser hardened optical detector of claim 2, wherein said substrate comprises CdTe.

4. The laser hardened optical detector of claim 3, wherein said protective layer is formed from $Hg_{1-Y}Cd_YTe$ and said detector layer is formed from $Hg_{1-X}Cd_XTe$, X and Y being constants with values less than one.

5. The laser hardened optical detector of claim 4, wherein constant Y is greater than constant X.

6. The laser hardened optical detector of claim 1, wherein one said operational mode is a transmitting mode and the other said operational mode is an absorbing mode.

7. A laser hardened optical detector comprising:

a detector layer; and a protective layer having two operational modes;

wherein one said operational mode is a transmitting mode and the other said operational mode is a reflecting mode; and wherein, said protective layer responds to the incident photon energy level by switching between said modes.

8. The laser hardened optical detector of claim 3, wherein said protective layer further comprises a plurality of layers having different indices of refraction;

wherein the index of refraction of each of said plurality of layers is changeably responsive to the incident photon energy level, and wherein said plurality of layers are configured such that said two operational modes are a conducting mode and a reflecting mode.

9. A laser hardening film disposed on at least one surface of a crystalline, optical detector layer, said film having:

a crystalline structure substantially identical to the crystalline structure of said crystalline optical detector layer; and said film having a first and second operational modes switchably responsive to the incident photon energy level.

10. The laser hardened film of claim 9, wherein said protective layer comprises HgCdTe.

11. The laser hardened film of claim 10, wherein said first operational mode is a transmitting mode and said second operational mode is an absorbing mode.

12. The laser hardened film of claim 9, wherein said first operational mode is a transmitting mode and said second operational mode is a reflecting mode.

13. A structure for laser hardening an optical detector, comprising:

a substrate disposed between an optical radiation source and the optical detector; and a protective layer formed on a surface of said substrate, said protective layer having first and second operational modes switchable responsive to an incident photon energy level.

* * * * *